July 3, 1934.  R. M. HICKS  1,965,376
INDICATOR
Filed Feb. 28, 1930   2 Sheets-Sheet 1

INVENTOR
Raymond M. Hicks.
BY
his ATTORNEYS

July 3, 1934.  R. M. HICKS  1,965,376
INDICATOR
Filed Feb. 28, 1930   2 Sheets-Sheet 2

INVENTOR
Raymond M. Hicks.
BY
Ward, Crosby & Neal
his ATTORNEYS

Patented July 3, 1934

UNITED STATES PATENT OFFICE 1,965,376

INDICATOR

Raymond M. Hicks, Larchmont, N. Y., assignor to The Teleregister Corporation, New York, N. Y., a corporation of Delaware Application February 28, 1930, Serial No. 432,027

12 Claims. (Cl. 177—328)

This invention relates to indicators, and especially to the general class of indicators such for example as is shown in the application of Merton L. Haselton, Serial No. 423,599, filing date January 27, 1930, these indicators being particularly adaptable for use in brokers' automatic blackboards or other bulletin boards for displaying information.

The objects of this invention include the provision of an indicator of the above identified class having mechanism involving a relatively small effective inertia whereby the indicator may be operated at unusually high speeds with a high degree of efficiency and durability and making use of a relatively small low power operating means.

Further and more specific objects, features and advantages will more clearly appear from the detailed description given below taken in connection with the accompanying drawings which form a part of this specification.

The invention consists in the novel arrangements, features and combinations of parts as hereinafter described, but by way of example only, as being illustrative of a preferred embodiment of the invention.

Figure 1:
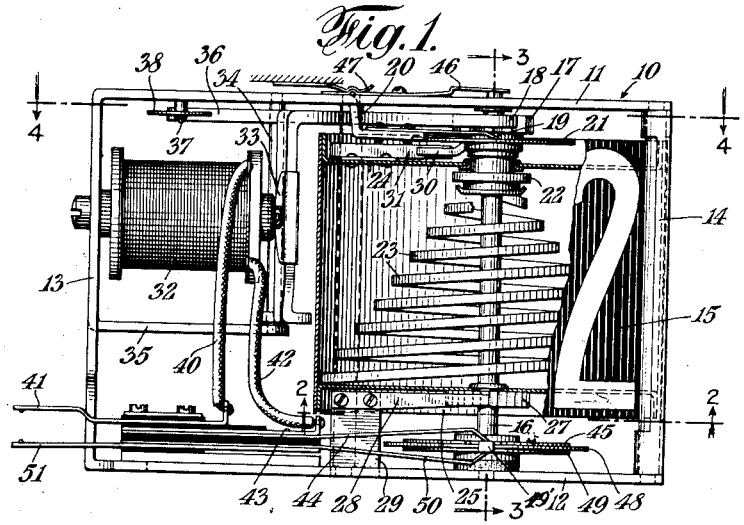
Fig. 1 is a side elevation with parts in section of one example of an indicator unit, comprising the features of this invention.
Figure 2:
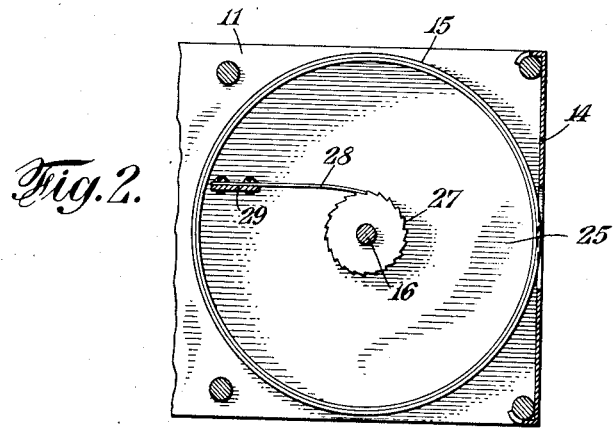
Fig. 2 is a section on the line 2—2 of Fig. 1.

The invention has been shown in connection with an indicator unit of the class shown in the application above referred to. It is to be understood, however, that various features hereinafter referred to and claimed, are not limited to an indicator unit of this general construction.

The indicator unit may comprise a frame 10 of general U shape, comprising an upper leg member 11, a lower leg member 12 and an end portion 13. The leg members 11 and 12 are connected by cross rods to provide a rigid frame construction. Secured to two of these cross rods is a mask 14 through which are displayed the indicia on an indicator drum 15 rotatably supported on a shaft 16 which in turn is rotatably supported in the members 11 and 12. As described in the co-pending application referred to, the indicator drum is preferably provided with indicia comprising a blank space and the digits 1 to 9 and 0.

Figure 4:
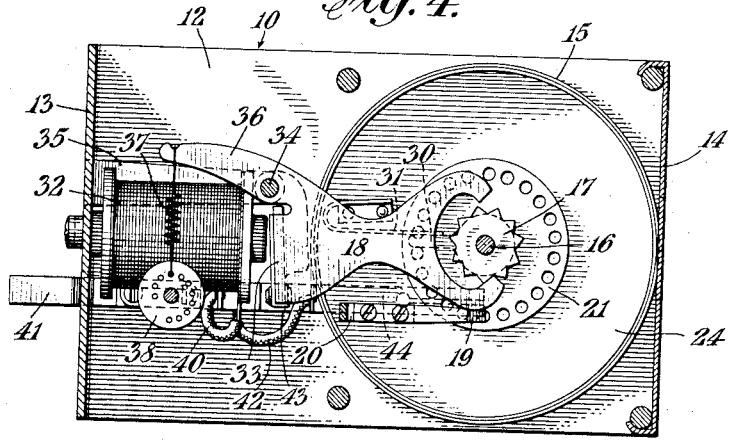
Fig. 4 is a horizontal section on line 4—4 of Fig. 1 showing the parts in the position they occupy when the operating magnet is deenergized.
Figure 5:
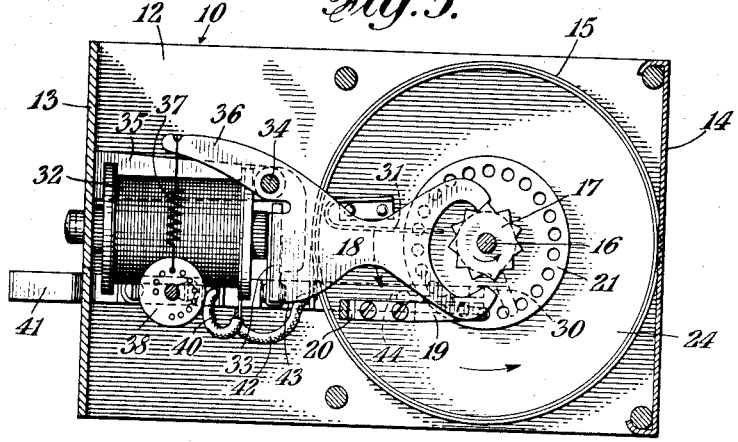
Fig. 5 is a view similar to the view in Fig. 4 with the parts in the position they occupy when the indicator is being energized for operation.

Secured to the shaft 16 is a star wheel driving disk 17 which is adapted to be driven by pawl or fork 18, as shown in Figs. 4 and 5. The star wheel is provided with 11 teeth corresponding to the 11 indicia positions on the indicator. The star wheel disk is held in an adjusted position by means of a spring pawl 19, secured to a portion 20 struck in from the frame portion 11, and cooperates with a disk 21 provided with a circular series of holes equal to twice the number of teeth on the star wheel.

Figure 3:
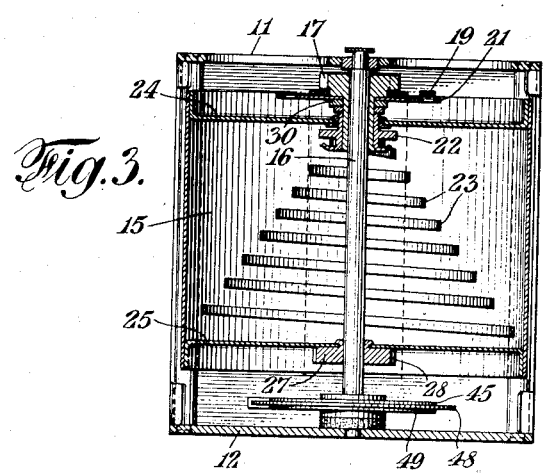
Fig. 3 is a vertical cross-section on line 3—3 of Fig. 1.
Figure 6:
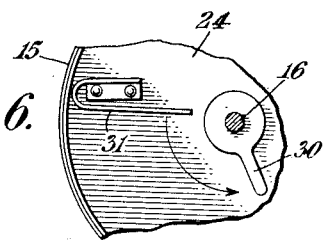
Fig. 6 shows the means for stopping the indicator dial in the adjusted position of the indicator shaft.

The star wheel disk 17, Fig. 3, may be provided with a downwardly extending sleeve portion on which is secured a hub member 22 constituting an anchor for one end of a relatively long and freely yieldable spiral spring 23 secured at its other end to the interior of the dial or drum 15, Fig. 1. The ends of the drum 15 may comprise outwardly flanged disks 24 and 25. The disk 24 is provided with a hub portion rotatable on a sleeve formed on the hub member 22. Also secured to the sleeve on the star wheel disk 17 is a finger 30, which as shown in Fig. 6, constitutes, in connection with a spring arm 31 secured to the disk 24, a stopping means for gently arresting the drum 15 after it has been moved by the spring 23 into a position corresponding to the position of the shaft 16. Figure 5 shows the position of the drum relative to the shaft as the shaft is being adjusted to home position or to a new indicating position.

The other end 25 of the drum is supported on the hub of a ratchet disk 27 which cooperates with a spring pawl 28, Fig. 1, secured on a member 29 struck from, or secured to the member 12 of the frame 10. The function of this ratchet disk 27 and pawl 28 is to prevent the drum 15 from rebounding when it is arrested by the finger 30 and spring arm 31, shown in Fig. 6.

In the application above referred to, this indicator is operated by an operating magnet 32 which cooperates with an armature portion 33 formed on the pawl or fork 18. As shown in Fig. 1, the fork 18 is pivoted on a rod 34 supported in the member 11 and in a member 35 struck in from the end wall 13 of the frame 10. This member 35 is spaced a considerable distance from the member 12 and terminates just beyond the rod 34. The fork 18 is provided with a rearwardly extending arm 36 to which is anchored a spring 37 adjustably anchored at its other end to a disk 38 rotatably supported on the member 11 and provided with a spiral series of holes for purposes of adjustment of the spring.

The magnet 32 is preferably secured to the end wall 13 between the members 11 and 35. The armature portion 33 occupies substantially the space between the members 11 and 35 and, together with these members and a portion of the end 13, provides an easy path of flow for the magnetic flux.

One terminal 40 of the magnet 32, as shown in Fig. 1, is connected to a terminal clip 41 to which the battery lead of the circuit for the magnet is connected. The other terminal 42 is connected to a plate 43 which is in contact with an armature brush 44, which cooperates with a commutator disk 45 secured to and in electrical connection with the shaft 16. Bearing on the upper end of shaft 16 is a contact member 46 which, when the indicator unit is in position as on a stock quotation board, makes electrical contact with the clip 47 secured to the board frame. The commutator comprises a non-conducting disk 48 on one side of which the commutator disk 45 is secured, and to the other side of which is secured another commutator disk 49 which cooperates with a brush 50 in contact with a clip 51 adapted to be connected by wire to ground when the indicator drum is to be reset.

As shown in Fig. 1, the disk 45 is interrupted to break contact with the brush 44 when the indicator dial displays any predetermined indicia space such for example as the blank space, thus breaking the ground for the terminal 42 when the indicator is in this position. The disk 49 is provided with a portion 49' which also occupies an interrupted portion of the disk 45, so that the circuit through the magnet may be completed by grounding the clip 51 to move the indicator out of blank position to set up amounts.

The operation of the magnet is as follows:

When impulses are sent in over terminal 40, and the indicator is in a position previously established to exhibit a particular digit, the other terminal of the magnet will be grounded through the brush 44, commutator disk 45, shaft 16, contact member 46, and clip 47. This will energize the magnet successively and move the indicator forward until this ground connection is broken as the blank space on the indicator dial is moved into displaying position. When it is desired to actuate the indicator forwardly to a new position, ground will be applied to the clip 51, which through the brush 50, commutator disk 49 and brush 44 applies ground to the magnet so that an impulse over the battery line will move the indicator from the blank to the "1" position. Thereafter when the indicator is in any position, except in home position, the ground will be applied through the commutator 45, shaft 16, contact member 46 and clip 47.

The construction disclosed permits of the use of a relatively low power operating magnet for a comparatively large indicating drum. The spring connection between the indicator drum and shaft permits an adjustment of the shaft relatively to the drum so that the inertia of the drum does not constitute a load on the operating magnet as the operation is started. The speed of adjustment may accordingly be greatly increased by the use of this invention.

While a specific embodiment of the invention has been shown and described, it is obvious, that modifications may be made and that many of the features disclosed may be used with modified forms or with different constructions of other of the features and that some of the features may be omitted under certain circumstances. The operating pawl or fork and star wheel construction, and the circuit connections disclosed, are shown in the copending application referred to. While the indicator drum has been shown relatively large to show the possibilities and advantages of the claimed construction, it is to be understood that certain or all of the features are applicable to relatively smaller indicator drums and that it is not essential to provide a separate frame for each indicator drum. The freely yieldable connection between the indicator drum and shaft in the construction disclosed, permits of restoration and actuation of the indicator shaft in less time than is required in constructions in which the indicator drum is secured to the shaft and thereby involves substantially greater effective inertia. After the shaft has been adjusted, circuit connections such as may be employed may be broken and other connections may be made as the drum moves into the adjusted position of the shaft. For any number of steps of adjustment of the shaft, the indicator drum is started and stopped but once, so that the load due to the inertia of starting need not be overcome at each oscillating movement of the operating pawl. The inertia due to starting may be distributed by the spiral spring over a number of steps of adjustment or a number of groups of such steps, thus facilitating easy starting of the indicator shaft and permitting the use of a relatively small power operating magnet. In the case when the shaft is given but one step of adjustment, the load on the shaft is practically no more than the force required to extend the spiral spring an amount equal to the distance through which the small end of the spring is moved.

The device as above described is relatively quiet in operation since the spring control of the position of the indicator drum eliminates any sharp hammering action in the indicator mechanism, such as would otherwise result from the rapid step-by-step movement of a relatively large drum. The device is therefore particularly adaptable for use with bulletin boards or quotation boards in public rooms, such as exchange halls and banks, etc. Furthermore, since a relatively large indicating dial may in accordance with this invention be controlled by a comparatively small sized magnet, these indicators may be used in connection with large bulletin boards designed to be read from a considerable distance, as on the floor of the larger exchanges, yet the indicators may be operated from the same circuits and power sources as used for the smaller indicators now in operation in the private establishments of brokers.

While the invention has been described in detail with respect to a certain preferred example thereof which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In an indicator construction comprising a rotatable shaft, an indicator drum rotatably mounted on said shaft, an elastic connection between said shaft and indicator drum to cause the drum to follow the movement of said shaft, means for arresting the movement of said drum after it has moved through substantially the same angular distance as the shaft, comprising a rigid arm on one of said members and a yielding arm on the other of said members, and means for preventing rebound of said drum with respect to said shaft.

2. In an indicator construction comprising a rotatable shaft, an indicator drum rotatably mounted on said shaft, an elastic connection between said shaft and indicator drum to cause the drum to follow the movement of said shaft, means for arresting the movement of said drum after it has moved through substantially the same angular distance as the shaft, comprising a rigid arm on one of said members and a yielding arm on the other of said members, and means for preventing rebound of said drum with respect to said shaft, said rebound means comprising a ratchet on one of said members and a cooperating detent on the other of said members.

3. The combination of a frame, an indicator shaft supported in the frame, an indicator drum rotatably supported on said shaft, said drum comprising a cylindrical indicia bearing surface, flanged supporting disks secured within the ends of the drum, a spring driving connection between said shaft and drum and located within the drum, a drum arresting arm on said shaft and a cooperating stop secured to one of said disks inside of one end of said drum, a rebound preventing means comprising a ratchet on said drum, and a cooperating detent on said frame located inside of the other end of said drum.

4. In an indicator unit comprising a generally U-shaped frame member, an indicator shaft supported in the legs of said U-shaped member, an indicator drum rotatably supported on said shaft, a driving connection between said shaft and drum, a driving star wheel disk secured to said shaft, a fork member for driving said star wheel disk, an armature on said fork member of considerably less length than the distance between the legs of said U-shaped member and extending transversely thereof, a supporting member struck up from the base of said U-shaped member, a rod in said supporting member and one of the legs of said U-shaped member for pivotally supporting said armature and fork, and a magnet for cooperating with said armature and located between said supporting member and said one leg of said U-shaped member.

5. An indicator construction comprising an adjustable indicator supporting shaft, a driving wheel secured to said shaft and provided with a collar surrounding said shaft, a drum indicator including closed ends respectively rotatably mounted on said shaft and collar, a relatively long spiral spring coiled in a generally conical shape about said shaft and operable to urge the drum into a predetermined position with respect to said shaft, means securing the smallest spiral of the spring to said collar, and means securing the largest spiral of the spring to an adjacent part of the drum.

6. In an indicator construction comprising a rotatable shaft, a star wheel on said shaft, an operating fork for rotating said star wheel with a step-by-step movement, an electromagnet and armature for operating said fork, an indicator drum rotatably mounted on said shaft, and an elastic connection between said shaft and indicator drum to cause the drum to follow the movement of said shaft.

7. In an indicator construction comprising a U-shaped frame member, a rotatable indicator drum mounted between the two branches of said member, a magnet and armature means for operating said drum mounted within the base of said U-shaped member and in the space between the base of said member and said drum, said magnet occupying a relatively small proportion of said space, and a supplemental member of magnetic material extending from the base of said U-shaped member adjacent said magnet for supporting said armature and providing, together with said frame and armature, a flux path for the magnet.

8. In combination, an indicator dial comprising a hollow cylindrical member of sheet material bearing indicia on its outer surface, a shaft extending axially thereof, drum heads fixed in each end of said cylindrical member acting to rotatably support the same in respect to said shaft, and an elastic connection between said shaft and said cylindrical member, housed within and protected by said member.

9. In an indicator construction comprising a frame, a rotatable shaft mounted therein, an indicator drum rotatably mounted on said shaft, an elastic connection between said shaft and drum to cause the drum to follow the movement of said shaft, ratchet means for preventing movement of said shaft in respect to said frame in one direction, and ratchet means for preventing movement of said drum in respect to said shaft in one direction.

10. An indicator comprising an indicia bearing dial, means for advancing said dial with a rapid step-by-step movement, and an elastic connection between said advancing means and said dial whereby the movement of said advancing means may proceed without immediately overcoming the inertia of said dial and whereby the movement of the dial follows that of the advancing means.

11. An indicator comprising an indicia bearing dial, means for advancing said dial with a rapid step-by-step movement, an elastic connection between said advancing means and said dial whereby the movement of said advancing means may proceed without immediately overcoming the inertia of said dial and whereby the movement of the dial follows that of the advancing means, and stop means cooperating with said advancing means and the dial to prevent the dial from exceeding the movement of said advancing means under the influence of said elastic connection.

12. An indicator comprising an indicia bearing dial, means for advancing said dial with a rapid step-by-step movement, an elastic connection between said advancing means and said dial whereby the movement of said advancing means may proceed without immediately overcoming the inertia of said dial and whereby the movement of the dial follows that of the advancing means, stop means cooperating with said advancing means and the dial to prevent the dial from exceeding the movement of said advancing means under the influence of said elastic connection, and ratchet means for preventing any rebound of the dial in respect to said advancing means.

RAYMOND M. HICKS.